May 5, 1953      I. M. EISENBERG      2,637,602

LOCOMOTIVE BRAKE EQUIPMENT

Filed Sept. 7, 1949      2 SHEETS—SHEET 1

INVENTOR.
Irwin M. Eisenberg
BY
Frank E. Miller
ATTORNEY

Patented May 5, 1953

2,637,602

UNITED STATES PATENT OFFICE 2,637,602

LOCOMOTIVE BRAKE EQUIPMENT

Irwin M. Eisenberg, Stewartsville, Irwin, Pa., assignor to Westinghouse Air Brake Company, a corporation of Pennsylvania Application September 7, 1949, Serial No. 114,362

10 Claims. (Cl. 303—40)

This invention relates to brake apparatus and more particularly to the type for use on locomotives of the electrically propelled type.

Certain locomotives of the diesel electric type are equipped with Westinghouse Air Brake Company's No. 8EL locomotive brake equipment for controlling braking of the locomotive pneumatically, and the electric propulsion motors are arranged to operate as generators for supplying electric current to a brake resistor for providing electric braking.

The No. 8EL locomotive brake equipment comprises a distributing valve device and an engineer's brake valve device consisting of an automatic portion and an independent portion. The automatic portion is provided for reducing pressure of fluid in the usual brake pipe to cause operation of the distributing valve device on the locomotive and of the triple valves or the like on cars of a train for effecting an automatic application of the fluid pressure brakes thereon. The independent portion of the engineer's brake valve device is provided for effecting operation of a portion of the distributing valve device to apply and release the fluid pressure brakes on the locomotive independently of the brakes on a train. If both the fluid pressure and electric brakes on the locomotive are effective at the same time, slipping and undesired wear of the locomotive wheels may occur, but under certain conditions it is desirable to be able to apply the fluid pressure brakes on the locomotive when the electric brakes are effective.

The principal object of the invention is therefore the provision of an improved locomotive brake equipment embodying both fluid pressure and electric braking means and interlock means automatically operative when the electric braking means is effective to prevent an automatic application of the fluid pressure brakes on the locomotive, but which will permit control of the fluid pressure brakes on the locomotive by operation of the independent portion of the engineer's brake valve device when the electric brakes are effective.

Other objects and advantages will become apparent from the following more detailed description of the invention.

In the accompanying drawings.

Description of parts

Figure 1:
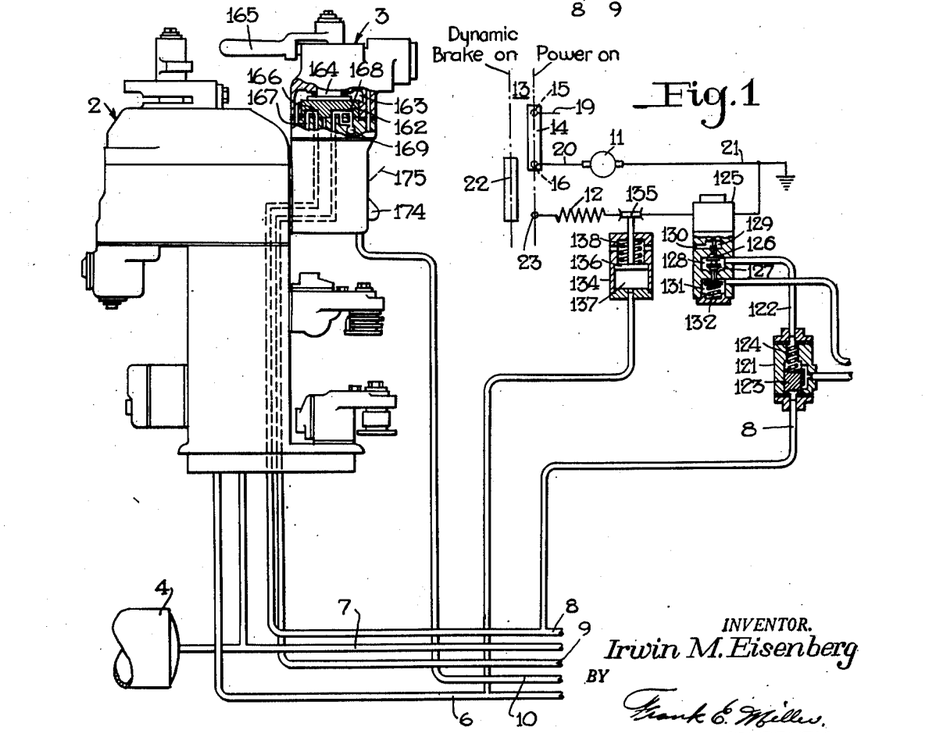
Figs. 1, 1a, when arranged with the right hand edge of Fig. 1 against the left hand edge of Fig. 1a, is a diagrammatic view, partly in section and partly in outline, of a combined electric and fluid pressure brake apparatus for a locomotive embodying the invention.
Figure 1A:
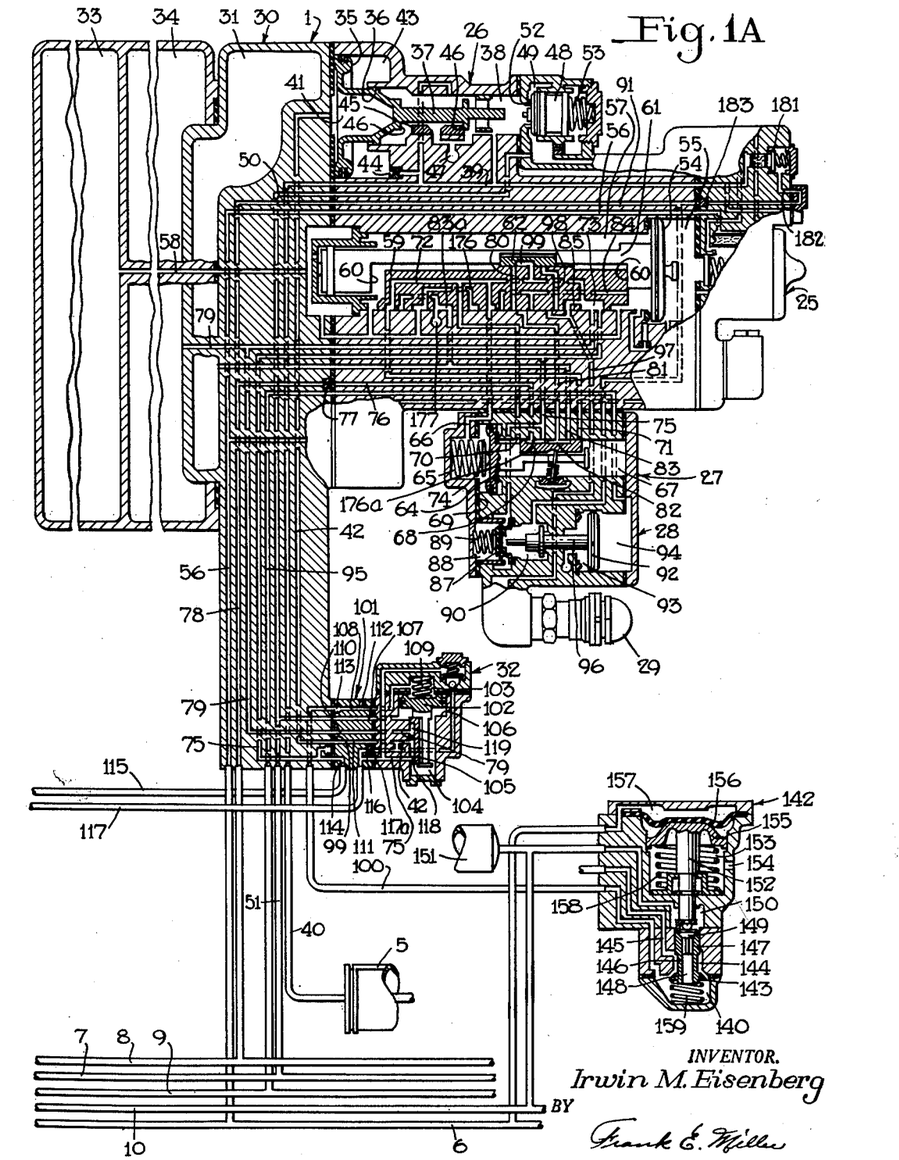

As shown in the drawing, the fluid pressure brake equipment for the locomotive comprises a distributing valve device 1, an engineer's brake valve device comprising an automatic brake valve device 2 and an independent brake valve device 3, a main reservoir 4, and a brake cylinder device 5. The fluid pressure brake equipment further comprises a brake pipe 6, a main reservoir pipe 7, independent application and release pipes 8 and 9, respectively, and a controlled emergency pipe 10.

The electric brake apparatus for the locomotive may, in a simple illustrative form, comprise a propulsion motor 11 adapted to be operated as a generator for supplying electric current to a dynamic braking resistor 12 for providing a decelerating force for braking purposes. The reference numeral 13 designates an engineer's controller which may have a power-on position and a dynamic brake-on position, as indicated in the drawing by suitable legends. In the power-on position a contact 14 in the controller is adapted to bridge a pair of contacts 15, 16 for completing a circuit for supplying electric current to the motor 11, such circuit being by way of example, from a wire 19, supplied with current from a suitable source such as a generator (not shown), the contact 14, the conductor 20, motor 11 and a grounded conductor 21. In the dynamic brake-on position a contact 22 is adapted to bridge contacts 16 and 23 for placing motor 11 in a dynamic braking circuit including resistor 12 which is effective to produce dynamic braking upon operation of motor 6 as a generator in a well-known manner.

The distributing valve device 1 comprises an equalizing portion 25, an application portion 26, a reduction chamber cut-off valve device 27, a release valve device 28 and a safety valve device 29 all of which parts are carried by a pipe bracket 30 in which there is provided a reduction chamber 31. Also carried by the pipe bracket 30 is a controlled emergency or delay valve device 32. The pipe bracket 30 is in turn carried by a reservoir portion in which there are provided a pressure chamber 33 and an application chamber 34.

The distributing valve device 1, the engineer's brake valve device including the automatic brake valve device 2 and the independent brake valve device 3 and other parts of the pneumatic brake equipment are, with an exception which will hereinafter be particularly pointed out, substantially the same in construction and operation as the Westinghouse Air Brake Company's No. 8EL locomotive brake equipment fully disclosed in their instruction pamphlet No. 5032-1, Sup. 3, dated November 1943 and also substantially the same in operation as the locomotive brake equipment fully disclosed in Patent No. 2,009,841, issued to Ellis E. Hewitt on July 30, 1935. Only such portions of the locomotive fluid pressure brake equipment are therefore disclosed in the drawing and only the portions of operation of said equipment which are essential to an understanding of the improvement provided by this invention will therefore hereinafter be described.

The application portion 23 of the distributing valve device comprises an application piston 35, a baffle piston 36 spaced from and connected to said application piston, and an operating stem 37 projecting from said baffle piston into a valve chamber 38 which is connected by a passage 39 and a pipe 40 to the brake cylinder device 5. At one side of the application piston 35 is a control or application piston chamber 41, commonly known as the application cylinder, which is connected by a passage 42 extending through the pipe bracket 30 to the controlled emergency valve device 32. Between the application piston 35 and baffle piston 36 is a chamber 43 which is open through a stabilizing choke 44 to the brake cylinder passage 39. A brake cylinder release valve 45 contained in valve chamber 38 is loosely mounted between two spaced shoulders 46 on the piston stem 37 for movement by the application piston 35. The valve 45 is provided for controlling communication between chamber 38, and thereby the brake cylinder device 5, and an atmospheric port 47. The application portion of the distributing valve device further comprises a fluid pressure supply valve 48 contained in a chamber 49 which is connected by a passage 50 to a pipe 51 connected to the main reservoir pipe 7, whereby said chamber is adapted to be constantly supplied with fluid under pressure from the main reservoir 4. A seat 52 is arranged to be engaged by the supply valve 48 for closing communication between chamber 49 and the valve chamber 38. A spring 53 acts on the supply valve 48 for urging it into contact with the seat 52. The supply valve 48 is arranged in coaxial relation with the application piston stem 37 so that upon movement of the piston 35 and said stem in the direction of the right hand, said stem will pass through the opening encircled by the valve seat 52 and engage and then unseat said valve against spring 53.

When the application piston chamber 41 is open to atmosphere, the parts of the application valve device 26 will assume a position in which the supply valve 48 is seated and the release valve 45 is opening communication between the valve chamber 38 and the atmospheric port 47 for thereby effecting a relase of fluid under pressure from the brake cylinder device 5 and a release of locomotive brakes. Upon supply of a fluid under pressure through passage 42 to the application piston chamber 41 the application piston 35 will move in the direction of the right hand and after a certain degree of such movement the left hand shoulder 46 will engage the release valve 35. Further movement of the application piston 35 will then shift the release valve 45 to a position for closing communication between valve chamber 38 and the atmospheric port 47. Still further movement of the application piston 35 by pressure of fluid in chamber 41 will bring stem 37 into engagement with the supply valve 48 and then open said valve against the pressure of spring 53 whereupon fluid under pressure from the main reservoir 4 present in chamber 49 will flow to valve chamber 38 and thence through passage 39 and pipe 40 to the brake cylinder device 5 for effecting an application of locomotive brakes. Fluid under pressure thus supplied to the brake cylinder device 5 by way of passage 39 will also flow from said passage through choke 44 into chamber 43 and therein act on the application piston 35 in opposition to the pressure of fluid in the control chamber 41, the pressure of fluid in said control chamber being also opposed by the pressure of fluid in valve chamber 38 acting on the baffle piston 36. When the pressure of opposing fluid in chambers 38 and 43 increases to a degree slightly in excess of the control pressure in chamber 41, the application piston 35, baffle piston 36 and thereby stem 37 will be moved in the direction of the left hand relative to the exhaust valve 45, due to the lost motion connection between the said valve and the two shoulders 46, until the right hand shoulder 46 engages said valve. This movement of the application piston 35 will permit closing of the supply valve 48 by spring 53 to prevent further flow of fluid under pressure to the brake cylinder device 5, for thereby limiting the increase in pressure therein and in valve chamber 38 and in chamber 43 to a degree substantially equal to that in the application piston chamber 41, and whereupon, with the right hand shoulder 46 in contact with the release valve 45 movement of piston 35 will cease in what is known as a lap position.

If the pressure of fluid in the application piston chamber 36 is reduced by releasing it through passage 42 the greater pressure then present in chambers 43 and 38 will move piston 35 and the exhaust slide valve 45 back to release position, in which they are shown in the drawing, for opening chamber 38 to the exhaust port 47 whereupon fluid under pressure will be released from the brake cylinder device 5 to effect a release of the locomotive brakes.

The equalizing portion 25 of the distributing valve device is provided for operation in response to a reduction in pressure of fluid in brake pipe 6 to supply fluid under pressure from the pressure chamber 33, which is normally supplied with fluid under pressure, to passage 42 leading to the application piston chamber 41, and for releasing fluid under pressure from said chamber 41 in response to an increase in pressure of fluid in said brake pipe.

To this end the equalizing portion 25 comprises a piston 54 at one side of which is a chamber 55 open to the brake pipe 6 by way of a passage 56 extending through the pipe bracket 30. At the opposite side of piston 52 is a valve chamber 57 open through a passage 58 to the pressure chamber 33. The valve chamber 57 contains a main slide valve 59 loosely mounted between two spaced shoulders 60 on a stem 61 projecting from the equalizing piston 54. Mounted to slide on the main slide valve 59 is an auxiliary slide valve 62 which is disposed in a recess in the piston stem 61 for movement therewith.

The reduction chamber cut-off valve device 27 comprises a piston 64 at one side of which is a chamber 65 open through a passage 66 to the seat of the main equalizing slide valve 59. At the opposite side of piston 64 is a valve chamber 67 containing a slide valve 68 connected for movement with the piston 64. The piston 64 and slide valve 68 have a normal position in which they are shown in the drawing and cut-off position defined by engagement between said piston and a gasket 69. Two passages 70 and 71 connect the valve chamber 67 to the seat of the main equalizing slide valve 59, the passage 70 being open to said chamber and the passage 71 being closed from said chamber by said slide valve when in its normal position shown in Fig. 1a, while passage 71 is open to said chamber and passage 70 is closed from said chamber by said slide valve when in its cut-off position.

The engineer's automatic brake valve device 2 is provided for varying the pressure of fluid in the brake pipe 6 and thereby equalizing piston chamber 55 of the distributing valve device 1 for controlling operation thereof to effect application and release of the locomotive brakes in the usual well-known manner. When the brake pipe 6 and thereby the equalizing piston chamber 55 are charged with fluid at normal pressure the equalizing piston 54 and connected slide valves 59 and 62 will assume their usual release position in which both passages 66 and 71 will be open to a port 72 in the main slide valve 59 and thence to a cavity 73 in said valve whereby the opposing fluid pressures on the reduction chamber cut-off valve piston 64 will be equalized to permit a spring 74 to move the piston 64 and slide valve 68 to their normal position for opening a passage 75, connected to cavity 73 in the equalizing slide valve 59 in its release position, to a passage 76 and thence by way of a normal release choke 77 to a passage 78 in the pipe bracket 30 which latter passage is connected to the independent application pipe 8. The application chamber 34 is open by way of a passage 79 to cavity 73 in the main equalizing slide valve 59 in its release position and the application piston chamber 41 is also adapted to be opened to passage 75 and thence cavity 73 in a manner which will be later described, when the main equalizing slide valve 69 is in its release position for thereby releasing fluid under pressure from said chambers under such a condition and in a manner which will be later brought out.

Figures 2, 3, 4, 5:
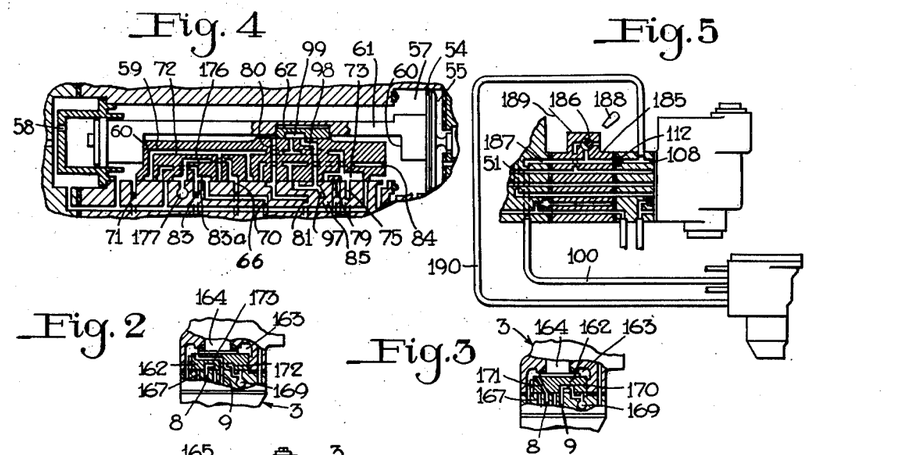
Figs. 2 and 3 are sectional, diagrammatic views of a portion of an independent brake valve device shown in Fig. 1, but with the rotary valve thereof shown in different positions.
Fig. 4 is a diagrammatic view of a part of the equalizing portion of the distributing device shown in Fig. 1 but with the slide valves and piston in a different position.
Fig. 5 is a diagrammatic view, similar to a portion of Fig. 1a, but showing a different use of the invention.

In response to a service reduction in pressure effected in brake pipe 6 and thereby in the equalizing piston chamber 55 by operation of the automatic brake valve device 2, the equalizing piston 54 and slide valves 62 and 59 will move to their usual service position in which these parts are shown in Fig. 5 of the drawing. In service position of the main slide valve 59 the reduction cut-off valve piston chamber 65 is open to atmosphere through passage 66, a port 176 in said slide valve and an atmospheric passage 177, while a service port 80 is uncovered by the auxiliary slide valve 62 and registers with a passage 81 leading to the seat of slide valve 68 in the reduction chamber cut-off valve device 27. With the slide valve 68 in its normal position a cavity 82 therein opens passage 81 to a passage 83 whereby fluid supplied from the pressure chamber 33 through service port 80 to the former passage and thence to the latter passage will flow to the reduction chamber 31 by way of the latter passage which is also connected to the seat of the main slide valve 59 and thence through a cavity 83a therein to passage 70 leading to the chamber 67 in the reduction cut-off valve device 27. When the pressure of fluid in chamber 67 and reduction chamber 31 is then increased by flow from the pressure chamber 33 sufficiently to overcome the opposing force of spring 74 on piston 64 (the chamber 65 being vented) said piston will move to its left hand or cut-off position for closing communication between passages 81 and 83 and for opening passage 81 to passage 75 whereby further flow of fluid from the pressure chamber 33 will be to the latter passage for supply to the application piston chamber 41 to effect a service application of the locomotive brakes in a manner which will be more fully described later.

In response to an emergency reduction in pressure in brake pipe 6 effected by the automatic brake valve device 2 the equalizing piston 54 will move the slide valves 62 and 59 to its extreme right-hand or emergency position and in this position a port 84 in the main slide valve 59 open to the equalizing valve chamber 57 without control by the auxiliary slide valve 62 will establish communication between the pressure chamber 33 and passage 81 for supplying fluid under pressure to the application piston chamber 41 for effecting an emergency application of brakes.

It is to be noted that passage 79 from the application chamber 34 is open by way of cavity 73 in the main slide valve 59 to passages 75 in service position of said main slide valve so that fluid will be supplied to said chamber from the pressure chamber 33 in effecting a service application of brakes, but in emergency position of said main slide valve the passage 79 will be lapped by a portion 85 of said main slide valve to prevent flow of fluid from the pressure chamber 33 by way of said main slide valve to the application chamber 34.

The release valve device 28 comprises a check valve 87 contained in a chamber 88 open to passage 75 and normally urged to a closed position by a spring 89. The check valve 87 is provided for closing communication between chamber 88 and a chamber 90 which latter chamber is open through a passage 91 to passage 78 in the bracket 30 leading to the independent application pipe 8, said check valve thereby controlling a communication from passage 75 to passage 78 by-passing the normal release choke 77 and of greater flow capacity than said choke. The release valve device 28 further comprises a piston 92 at one side of which is an atmospheric chamber 93 while at the opposite side is a chamber 94 connected by a passage 95 to the independent release pipe 9 extending to the independent brake valve device 3. A stem 96 projects from piston 92 to engage and unseat the check valve 87 upon movement of piston 92 in response to supply of fluid under pressure to chamber 94.

The safety valve device 29 is open through a passage 97 to the seat of the main equalizing slide valve 59. In service position of the slide valve 59 a port 98 therein is adapted to connect passage 97 to a cavity 99 in the auxiliary slide valve 62 and thence by way of port 72 in main slide valve to cavity 73 and thereby to the application chamber 34 and application piston chamber 41, while in emergency position of said main slide valve passage 97 is adapted to be opened to port 84 in said slide valve and thereby to the pressure chamber 33 and connected application piston chamber 41, for thereby limiting to a chosen safe degree pressure of fluid obtained in said piston chamber and thereby the degree of brake application on the locomotive under such conditions.

It will now be seen that in both the service and emergency positions of the equalizing piston 54 and slide valves 59 and 62 fluid under pressure is permitted to flow from the pressure chamber 33 to passage 75 and to the safety valve device 29, while the application chamber 34 is connected to passage 75 in service position but not in emergency position of said slide valves.

The passage 75 just mentioned, the passage 42 from the application piston chamber 41, passage 79 from the application chamber 34, the main reservoir, passage 50 and a pipe 100 connected to pipe bracket 30 are all connected to a mounting face 99 on said pipe bracket for, heretofore, registry with aligned passages, bearing the same reference numerals, in the controlled emergency valve device 32. Interposed between the controlled emergency valve device 32 and the mounting face 99 on the pipe bracket 30 is however a filler piece 101 constituting a part of the present invention.

The controlled emergency valve device 32 comprises a piston 102 at one side of which is a chamber 103 and at the opposite side of which is a valve chamber 104 containing a slide valve 105 arranged to be moved by said piston to two different positions, namely, a position for short freight train or passenger train operation, in which these parts as shown in the drawing, and a position for long train operation in which the piston and slide valve will be moved down until said piston contacts a shoulder 106 in the casing.

The valve chamber 104 is adapted to be constantly supplied with fluid under pressure from the main reservoir pipe and passage 50 by way of a passage 107 extending through the filler piece 101. Chamber 103 at the opposite side of piston 102 is adapted to be either charged with fluid under pressure or to be open to atmosphere by way of a passage 108 extending through the filler piece 101 and connecting said chamber to pipe 100. When the chamber 103 is open to atmosphere, in a manner which will be later described, the piston 102 and slide valve 105 will assume their short train position under pressure of fluid effective in valve chamber 104, while upon supply of fluid under pressure to chamber 103 a spring 109 therein will move the piston 102 and slide valve 105 to their lower or long train position.

In addition to the passages 108 and 107 extending through the filler piece 101 for connecting aligned passages in bracket 30 and the controlled emergency valve device 32, said filler piece also has through passages 110 and 111 connecting respectively, passages 79 and 42 in the bracket to aligned and correspondingly numbered passages in valve device 32. The filler piece 101 has an opening for connecting passage 108 to the outer surface of the filler piece which opening is closed by a plug 112 in the structure shown in Fig. 1A. At the end of passage 108 against the pipe bracket 30 is a cavity 113 adapted to receive plug 112 upon removal from the location in which it is shown in Fig. 1A under a condition to be later brought out. With the plug 112 positioned as shown in Fig. 1A, it will be seen that passage 108 connects piston chamber 103 to pipe 100 as above described.

The filler piece 101 also has a passage 114 connecting passage 75 in the bracket to an external pipe 115. Still further, the filler piece 101 has a passage 116 connecting an external pipe 117 to passage 75 in the controlled emergency valve device 32. A branch of passage 116 containing a choke 117a connects passage 116 to passage 42 in the controlled emergency valve device.

The slide valve 105 of the controlled emergency valve device has a cavity 118 for establishing communication between passages 75 and 42 therein, by-passing the choke 117a, in the short train position of said valve. In the long train position of the valve 105 the communication just described is closed and a cavity 119 connects passages 42 and 79 in the controlled emergency valve device, which connection is closed in the short train position of said valve.

It will thus be seen that in the short train position of the control emergency valve device 32 the application piston chamber 41 is opened around the choke 117a to pipe 117, and passage 110 from the application chamber 34 is disconnected from said piston chamber, while in the long train position of said valve device communication between passage 116 and the application chamber 34 and application piston chamber 41 is through choke 117a.

From the above description it will be noted that interposing the filler piece 101 between the controlled emergency valve device 32 and pipe bracket 30 merely intercepts the connection between passage 75 in said bracket and passages 75 and 42 in said valve device and provides a means for connecting said passages 75 to the external pipes 115 and 117 as above described, the filler piece further providing the recess 110 and other recess in which the plug 112 is disposed for reasons which will be later brought out.

The pipe 117 leads to the side outlet of a double check valve device 121 the opposite ends of which are open to the independent application pipe 8 and to a pipe 122, respectively. The double check valve device 121 comprises a double check valve 123 adapted to operate in response to supply of fluid under pressure to the independent application pipe 8 to open communication between said pipe and pipe 117 and to close off the latter pipe from pipe 122 at a time when pipe 122 is vented. A bias spring 124 acting on the double check valve 123 is provided for actuating said check valve to the position in which it is shown in the drawing for closing communication between pipes 8 and 117 and for opening the latter pipe to pipe 122 when pipe 8 is vented.

The pipes 122 and 115 lead to a magnet valve device 125 adapted to be energized when the dynamic brakes on the locomotive are effective and deenergized at other times and to this end said magnet valve device is shown in the drawing, for illustrative purposes, connected in series between wire 21 and the dynamic brake resistor 12.

The magnet valve device 125 comprises two valves 126, 127 contained in a chamber 128 to which pipe 122 is open. The valve 126 is provided for controlling communication between chamber 128 and a chamber 129 which is open to atmosphere through a port 130. The valve 127 is provided for controlling communication between chamber 128 and a chamber 131 to which pipe 115 is connected. When the magnet of the magnet valve device 125 is energized the valve 126 is adapted to be open and the valve 127 closed, and when said magnet is deenergized a spring 132 is adapted to open valve 127 and close valve 126.

For preventing operation of the dynamic brakes on the locomotive at a time when an emergency application of the fluid pressure brakes is effective in response to an emergency reduction in pressure of fluid in the brake pipe 6 effected by operation of the automatic brake valve device 2, or otherwise, a pneumatic switch 134 is provided. This switch comprises a contact element 135 for opening and closing the dynamic brake circuit, as between the wire 21 and the resistor 12. The contact 135 is connected to a piston 136 at one side of which is a pressure chamber 137 open to the brake pipe 6 while at the opposite side is a spring 138 acting on said piston. When the brake pipe 6 and thereby chamber 137 are charged with fluid under pressure the contact 135 will be moved to a dynamic brake circuit closing position in which it is shown in the drawing, while when said pipe and chamber are vented, as in effecting an emergency application of brakes, the spring 138 will actuate the piston 136 and thereby the switch 135 to a position for opening the dynamic brake circuit.

Pipe 100 from piston chamber 103 in the controlled emergency valve device 32 leads to a valve chamber 140 in a relay valve device 142. A valve 143 contained in chamber 140 controls communication between said chamber and a chamber 144 which is open to atmosphere through a passage 145. The valve 143 is provided on one end of a stem 146 extending through a chamber 144 and connecting said valve to a plunger 147 which is slidably mounted in a suitable bore in the casing. On the end of plunger 147 opposite valve 143 is a valve seat encircling an axial passage 148 and provided for contact by a valve 149 contained in a chamber 150. The passage 148 extends through the plunger 147, valve stem 146 and valve 143 and is constantly open to chamber 140, the valve 149 being provided for controlling communication between said chamber and the chamber 150. The chamber 150 is open to the controlled emergency pipe 10 to which is connected close to the valve device 142 a volume reservoir 151. The valve 149 is connected to one end of a stem 152 extending from chamber 150 through a suitable bore in the casing into the chamber 153 which is open to atmosphere through a port 154. The opposite end of the stem 152 is in the form of a follower 155 which engages one side of a diaphragm 156 at the opposite side of which there is a chamber 157 which is open to brake pipe 6. A spring 158 in chamber 153 acts on the diaphragm 156 in opposition to pressure of fluid in chamber 157. When chamber 157 is charged with fluid under pressure from brake pipe 6 the diaphragm 156 will be deflected against spring 158 for seating valve 149 on plunger 147 and for then actuating said plunger to open valve 143 for thereby opening chamber 103 in the controlled emergency valve device 32 to atmosphere by way of the atmospheric passage 145. When chamber 157 is vented, as upon an emergency reduction in pressure in the brake pipe 6, spring 158 will deflect diaphragm 156 in the direction of chamber 157 for thereby unseating the valve 149. Upon unseating of valve 149, a spring 159 contained in chamber 140 and acting on valve 143 will close said valve whereupon chamber 103 in the controlled emergency valve device 32 will be opened by way of chamber 144 to passage 148 and past the unseated valve 149 to the controlled emergency pipe 10.

The independent brake valve device 3 comprises a rotary valve 162 contained in a chamber 163 which is normally charged with fluid under pressure, as well known, and said valve is connected by a key 164 to an operating handle 165. The handle 165 and rotary valve 162 have the usual running position in which these parts are shown in Fig. 1 of the drawing and said handle is operative to turn said rotary valve to the usual release position (Fig. 2) and to slow and fast application positions, the rotary valve 162 being shown in one of the application positions in Fig. 3 of the drawing. The application pipe 8 and independent release pipe 9 are connected to the seat of rotary valve 162 and said rotary valve has a cavity 166 adapted in its running condition to open the application pipe 8 to a passage 167 which, while not shown in the drawing, is open to atmosphere through the automatic brake valve device 2 in its running position, as well known. A cavity 168 in rotary valve 162 opens the independent release pipe 9 to an atmospheric port 169 in the running position of said rotary valve. In the application position of rotary valve 162 (Fig. 3) the independent release pipe 9 is open to atmospheric port 169 by way of a cavity 170 in said rotary valve while the independent application pipe 8 is open through a port 171 in said rotary valve to the rotary valve chamber 163 whereby fluid under pressure will flow to said pipe. In the release position of rotary valve 162 (Fig. 2) the independent application pipe 8 is open to the atmospheric port 169 by way of a cavity 172 in the rotary valve while the independent release pipe 9 is open through a port 173 in the rotary valve to the rotary valve chamber 163 so as to receive fluid under pressure from said chamber.

The controlled emergency pipe 10 leads to a selector valve in the independent brake valve device 3 which comprises a handle 174 having a short train position in which it is shown in the drawing for opening said pipe to atmosphere and having a long train position, designated by a dotted line 175, for supplying fluid under pressure to said pipe.

Operation

In operation, let it be assumed that the dynamic brakes on the locomotive are ineffective, that the brake pipe 6 is charged with fluid under pressure by operation of the automatic brake valve device 2, that the independent brake valve handle 165 and rotary valve 162 are in their running position in which they are shown in Fig. 1, and that the selector valve handle 174 is in short train position venting the controlled emergency pipe 10. With the controlled emergency pipe 10 vented, reservoir 151 and the chamber 150 in the relay valve device 142 will likewise be vented. With the brake pipe 6 charged with fluid under pressure and chamber 157 in the relay valve device 142 likewise charged, the diaphragm 156 will be deflected to close valve 149 and open valve 143 for thereby venting, by way of the latter valve, piston chamber 103 in the controlled emergency valve device 32 associated with the distributing valve device. With chamber 103 vented fluid under pressure from the main reservoir pipe 7 acting in valve chamber 104 will hold the piston 102 and slide valve 105 in their non-controlling or short train position in which these parts are shown in the drawing.

With brake pipe 6 charged the parts of the distributing valve device will assume their brake release position for charging the equalizing valve chamber 57 and the pressure chamber 39 and for venting the application piston chamber 41 to atmosphere through passage 42, cavity 118 and passage 75 in the controlled emergency slide valve 105, pipe 117, past the upper end of the double check valve 123, pipe 122, past the open valve 127 in the magnet valve device 125, pipe 115, passage 75 in the pipe bracket 30, cavity 176a in the reduction chamber cut-off slide valve 68, passage 76, the normal release choke 77, passage 78, the independent application pipe 8, cavity 166 in the rotary valve 162 of the independent brake valve device 3, and thence through passage 167 and the automatic brake valve device 2, with said brake valve devices in the usual running position as in Fig. 1. With the independent application pipe 8 vented as just mentioned, the double check valve 123 will assume the position for opening pipe 117 to pipe 122 due to the pressure of spring 124, and thereby establish the communication just described, as will be evident.

With the dynamic brakes released, if the engineer desires to effect an automatic service application of brakes on the locomotive, he will operate the automatic brake device 2 to effect a service reduction in pressure in the brake pipe 6 in response to which the equalizing portion 25 of the distributing valve device will move to service position for supplying fluid under pressure from pressure chamber 33 to the application chamber 34 and to passage 75 in the bracket 30 as above described. The fluid thus supplied to passage 75 will flow through pipe 115, past the open valve 127 in the magnet valve device 125, through pipe 122 and the double check valve device 121 to pipe 117, and thence through passage 75 in the controlled emergency valve device 32 and cavity 118 in slide valve 105 and passage 42 also in said device to passage 42 in the bracket 30 leading to the application piston chamber 41. Fluid from the pressure chamber 33 is thus supplied to both the application chamber 34 and application piston chamber 41 and acting in the latter chamber will actuate the application portion 26 of the distributing valve device to effect a service application of brakes.

In case an emergency application of brakes is desired the engineer will operate the automatic brake valve device 2 to emergency position for effecting an emergency reduction in pressure in brake pipe 6. In response to such reduction the equalizing portion 25 of the distributing valve device will move to emergency position for opening the pressure chamber only to passage 75 from which fluid under pressure will flow to the application piston chamber 41 through the same path as above described, but in this case, with the controlled emergency valve device 32 in short train position, no fluid under pressure will be supplied to the application chamber 34 and a maximum rate of increase and degree of pressure will be obtained in the application piston chamber 41 limited by the connected safety valve device 29.

If the selector valve handle 174 on the independent brake valve device 3 is in its long train position supplying fluid under pressure to the controlled emergency pipe 10 and thence to reservoir 151 and valve chamber 150 of the relay valve device 142, said relay valve device will be venting pipe 100 except upon an emergency reduction in brake pipe pressure, so that when a service application of brakes is effected as above described, the controlled emergency valve device 32 will remain in its short train position and fluid from the pressure chamber 33 will flow to both the application chamber 34 and application piston chamber 41 for effecting a service application of locomotive brakes in the same manner as above described. However upon an emergency reduction in brake pipe pressure, the relay valve device 142 will operate to open pipe 100 to the controlled emergency pipe 10 and charged reservoir 151 so that fluid under pressure from said reservoir will equalize into chamber 103 of the controlled emergency valve device 32 and permit spring 109 to move the parts of said device to their long train position. The fluid under pressure supplied from pressure chamber 33 to passage 75 in the bracket for supply to the application piston chamber 41 will then have to flow through the controlled emergency choke 117a to said chamber and at the same time through cavity 119 in the controlled emergency slide valve 105 to passage 79 and the application chamber 34 whereby a relatively slow rate of build-up in pressure is obtained in the application piston chamber 42 and thereby a correspondingly slow rate of brake application is obtained on the locomotive to avoid harsh gathering of slack in a long train.

The reservoir 151 is employed to provide, close to the distributing valve device, a local volume of fluid under pressure to quickly provide the necessary pressure in chamber 103 of the controlled emergency valve device to effect movement thereof to its long train position upon an emergency reduction in brake pipe pressure, as just described.

In order to release either a service or an emergency application of brakes effected as above described, the automatic brake valve device 2 will be returned to its usual running position for recharging the brake pipe 6 and reopening the independent application pipe 8 to atmosphere. In response to the increase in brake pipe pressure, the equalizing portion 25 of the distributing valve device will return to its release position for recharging the pressure chamber 33, and for causing the reduction cut-off valve device 27 to return to its normal position to open passage 75 to passage 76, whereupon the application piston chamber 41 and application chamber 34 will be vented via the path including the normal release choke 77 hereinbefore described, for effecting a release of the locomotive brakes, the spring 124 insuring that the double check valve 123 will occupy the position shown in the drawing for opening said path of communication with the independent brake valve device in running position for venting the independent application pipe 8 subsequent to an automatic application of the fluid pressure brakes on the locomotive.

If the engineer desires to effect an application of brakes on the locomotive independent of the brake pipe 6, and hence independent of the brakes on a train, he will move the independent brake valve handle 165 to its application position (Fig. 3) for supplying fluid under pressure to the independent application pipe 8. Fluid thus supplied to pipe 8, with pipe 122 vented via the distributing valve device 1 in its release position, will shift the double check valve 123 to its upward position for opening pipe 8 to pipe 117 through which fluid will flow by way of cavity 118 in the controlled emergency valve device 32 to passage 42 in the bracket 30 and thence to the application piston chamber 41 for operating the application portion 26 of the distributing valve device to effect an application of brakes.

In order to release an application of brakes effected by operation of the independent brake valve device as just described, the independent brake valve handle 165 may be returned to its running position (Fig. 1) whereupon the fluid will be released from the application piston chamber 41 by reverse flow through the pipes 117 and 8, as will be apparent.

If the equalizing portion of the distributing valve device is in either its service or emergency position effecting an application of locomotive brakes, such an application may be released, if desired, by moving the operator's independent brake valve handle 165 to its quick release position (Fig. 2) for supplying fluid under pressure to the independent release pipe 9 and in which position the independent application pipe 8 is open to atmosphere. The pressure of fluid thus supplied to the independent release pipe 9 will flow to chamber 94 in the release valve device 28 and operate piston 92 to open check valve 87 whereupon fluid from the application piston chamber 41 will be released through the bracket passage 42, the controlled emergency valve device 32, pipe 117, past the upper end of the double check valve 123, which will be in its lower position when an automatic application of brakes is in effect, through the open valve 127 of the magnet valve device 125, pipe 115, passage 75 in the distributing valve device, past the open check valve 87 to chamber 90 and thence through passages 91 and 78 to the independent application pipe 8 which is open to atmosphere through the independent brake valve device 3 at this time.

If a reapplication of the brakes on the locomotive is desired with the equalizing portion of the distributing valve device still in its service position such reapplication may be effected by movement of the independent brake valve handle 165 to its application position (Fig. 3) whereupon the brakes will be reapplied via the controlled emergency valve device 32 in the same manner as above described. If the controlled emergency valve device 32 should be in its long train position at this time, the application will occur through the controlled emergency choke 117a in said device and at the same time via passages 78, 91, check valve chamber 90, past check valve 87 and thence through passage 75 and the controlled emergency valve device by passing said choke.

With but one exception, which will be hereinafter described, the brakes on the locomotive can be controlled as just described with the improved brake equipment, including the filling piece 101 and the relay valve device 142, in the same manner as with the No. 8EL locomotive brake equipment.

Now let it be assumed that the locomotive is being braked by the dynamic brakes in which case the magnet of the magnet valve device 125 will be energized opening valve 126 and closing valve 127. If a service application of the fluid pressure brakes were effective at the time the dynamic brakes were rendered effective, such service application of brakes will be released past the open valve 126 in the magnet valve device 125, by virtue of release of fluid under pressure from the application piston chamber 41 through pipe 117, the double check valve device 121 and pipe 122 whereby both the dynamic and automatic fluid pressure brakes cannot be effective at the same time during normal braking of the train. When the dynamic brakes are effective if the pressure of fluid in the brake pipe 6 is reduced for effecting a service application of the brakes, the distributing valve device will operate in the same manner as hereinbefore described to supply fluid under pressure to pipe 115 but with the valve 127 in the magnet valve device 125 closed, fluid will be prevented from flowing from pipe 115 to pipe 117 and thereby an automatic application of the fluid pressure brakes on the locomotive will be prevented.

If, however, it becomes necessary to apply the fluid pressure brakes on the locomotive at the time the dynamic brakes are effective this may be accomplished by movement of the independent brake valve device handle 165 to application position (Fig. 3) in which case fluid under pressure will be supplied to the independent application pipe 8 and thence through the double check valve device 121 to pipe 117 and to the application piston chamber 41 in the same manner as above described. Such an independent application of the locomotive brakes, while the dynamic brakes are effective, may also be released when desired by returning the handle 165 to its normal running position or to its quick release position (Fig. 2) in which case the release will occur in the same manner as hereinbefore described.

Whenever an emergency reduction in pressure in brake pipe 6 is effected, the switch device 134 will operate to break the dynamic braking circuit to thereby either prevent the dynamic brakes becoming effective, or in case they are effective at the time to render them ineffective and the distributing valve device 1 will operate in the same manner as hereinbefore described to apply the brakes on the locomotive either at a fast or slow rate determined by the position of the selector valve handle 174 on the independent brake valve device 3, as hereinbefore described.

As hereinbefore mentioned the operation of the distributing valve device in response to variations in pressure of fluid in the brake pipe 6 to control the brakes on the locomotive, and the control of the brakes on the locomotive by operation of the independent brake valve device 3 is the same as in the well-known No. 8EL locomotive brake equipment with but one exception which will now be described.

In the well-known 8EL brake equipment the brake cylinder passage 39 is open past a check valve 181 to a passage 182 in turn open to the passage 91 above the equalizing piston 54 and thereby to the independent application pipe 8. Thus when an automatic application of brakes on the locomotive is effective in response to a reduction in pressure in the brake pipe 6 the independent application pipe 8 will become charged with fluid under pressure from the brake cylinder device 5. Then when the equalizing piston 54 operates the main equalizing slide valve 59 back to its release position for effecting a release of such an application, and in which position the application piston chamber 41 will be connected by way of the reduction cut-off valve device 27 to passage 78 and then through choke 77 to the independent application pipe 8, the pressure of fluid in the application piston chamber will not reduce by equalizing into said independent application pipe and thereby effect an undesired and uncontrolled degree of brake release.

If the dynamic brakes become effective at the time an automatic service application of the fluid pressure brakes were effective this communication past the check valve 181, if open, would permit flow of fluid under pressure from the brake cylinder passage 39 to the independent application pipe 8 and thence to the lower end of the double check valve 122. Upon venting the upper end of the double check valve 122 past the open valve 126 in the magnet valve device 125 said double check valve would be shifted to its upper position by the fluid under pressure in the independent application pipe 8 and such fluid from the brake cylinder passage 39 would then flow to pipe 117 and thence to the application piston chamber 41 and maintain the pressure of fluid in the latter chamber and thereby hold the fluid pressure brakes on the locomotive applied while the dynamic brakes were effective. This is undesired and in order to prevent such occurring a plug 183 is provided to close communication between the passages 182 and 91 in the distributing valve device. This plug eliminates the charging of the independent application pipe 8 when an automatic application of the fluid pressure brakes is effective with the dynamic brake ineffective, as will be seen, but it is a necessary modification when adding dynamic brake control to a locomotive equipped with the No. 8EL locomotive brake equipment.

On diesel locomotives of the multiple unit type the A or leading unit will be equipped with the fluid pressure brake equipment above described while a B or trailing unit will be similarly equipped except for the engineer's automatic and independent brake valve devices 2 and 3 which will be provided only on the leading unit. The brake pipe 6 will extend through the trailing B unit of the locomotive for connection with the brake pipe on a train; the independent application pipe 8, the main reservoir pipe 7 and the independent release pipe 9 will all extend to the trailing unit for connection with the distributing valve device 1 thereon; and on certain locomotives the controlled emergency pipe 10 will also extend to the B unit of the locomotive for connection with the relay valve device 142 thereon. With such an arrangement the apparatus on the trailing unit will operate in synchronism with that of the leading unit in response to control from the brake valve devices 2 and 3, as will be apparent.

On certain multiple unit locomotives the controlled emergency pipe 10 does not however extend to the trailing locomotive unit or units and on such units it has been customary to interpose between the bracket of the distributing valve device 1 and the controlled emergency valve device 32 a filler piece 185 (Fig. 5) and to plug the pipe connection of pipe 100 to the pipe bracket 30. The filler piece 185 has passageways extending between the pipe bracket 30 and the controlled emergency valve device 32 for providing normal operation of the brake equipment and also comprises a selector valve 186 for controlling communication between the main reservoir passage 51 and the controlled emergency piston chamber 103. The selector valve 186 has a long train position in which it is shown in the drawing for opening communication between the main reservoir passage 51 and a passage 187 heretofore adapted to be open to chamber 103 in the controlled emergency valve device 32 and a short train position for closing said communication and venting passage 187. A handle 188 is provided for turning the selector valve 186 from its long train position in which it is shown in the drawing to its short train position in which said handle will be located at a line designated by the reference numeral 189.

In accordance with the present invention on B units of multiple unit locomotives not equipped with a controlled emergency pipe 10 and equipped with the filler piece 185, I interpose the filling piece 101 between the filler piece 185 and the controlled emergency valve device 32. I remove the plug 112 from the filling piece 101 and connect thereto a pipe 190 for connecting passage 108 in said filling piece to valve chamber 140 in the relay valve device 142. The removed plug 112 I place in the recess 113 in the filling piece 101 for closing communication between passage 108 in said filling piece and the passage 187 in the old filling piece 185. The pipe 100, connected to passage 187 in the old filling piece 185, I connect to valve chamber 150 in the relay valve device 142. With the selector valve 186 in the long train position in which it is shown in Fig. 5 fluid from the main reservoir pipe 51 will therefore be supplied through pipe 100 to chamber 150 in the relay valve device 142, so that upon operation of said relay valve device in response to an emergency reduction in pressure of fluid in the brake pipe 6, as before described, the fluid under pressure from the pipe 100 will be supplied through pipe 190 to piston chamber 103 of the controlled emergency valve device 32 for actuating same to its long train position to delay an emergency application of locomotive brakes when the locomotive is connected with a long train, in the same manner as hereinbefore described in connection with the structure shown in Fig. 1a. When the selector valve 186 in the filler piece 185 is in short train position venting the pipe 100 there will be no supply of fluid under pressure to piston chamber 103 in the controlled emergency valve device 32 whereby upon operation of the relay valve device 142 in response to an emergency reduction in brake pipe pressure the controlled emergency valve device 32 will remain in its short train position and the locomotive brakes will be applied in the same manner as with the structure shown in Fig. 1a.

It will therefore be seen that when the selector valve handle 174 on the A unit of the locomotive is moved to a certain position and the selector valve 186 on a B unit is correspondingly positioned the brakes on both units will operate in like manner in response to either a service or an emergency reduction in pressure in the brake pipe 6.

*Summary*

From the above description it will now be seen that I have provided means for interlocking operation of the well-known 8EL locomotive brake equipment and the dynamic brakes of a locomotive, comprising one or more power units, in such a manner that with the dynamic brakes released the automatic fluid pressure brakes may operate in the usual manner and which, with the dynamic brakes applied, prevents an automatic application of the fluid pressure brakes on the locomotive or, if such an application is in effect at the time the dynamic brakes are brought into operation such automatic application of the fluid pressure brakes will be released. In case of an emergency reduction in pressure of fluid in the brake pipe, the dynamic brakes, if effective, will be cut out however when the fluid pressure brakes are brought into operation. With the dynamic brakes effective the fluid pressure brakes on the locomotive can be applied and released, if necessary however, by operation of the independent brake valve device of the 8EL brake equipment.

Having now described the invention, what I claim as new and desire to secure by Letters Patent, is:

1. In a fluid pressure brake equipment, in combination, a brake pipe, means operative in response to a reduction in pressure of fluid in said brake pipe to supply fluid under pressure to effect an application of brakes, valve means for either restricting said supply or permitting a faster rate of said supply, means operative by pressure of fluid in said brake pipe for conditioning said valve means to provide said faster rate of supply, and means operative upon an emergency reduction in brake pipe pressure to condition said valve means to restrict said supply.

2. In a fluid pressure brake equipment, in combination, a brake pipe, means operative in response to a reduction in pressure of fluid in said brake pipe to supply fluid under pressure to effect an application of brakes, valve means responsive to pressure of fluid in a chamber to retard said supply of fluid under pressure and operative upon release of fluid under pressure from said chamber to provide for a faster rate of said supply, means operative by pressure of fluid in said brake pipe for venting said chamber, and means operative upon an emergency reduction in brake pipe pressure to supply fluid under pressure to said chamber.

3. In a fluid pressure brake equipment, in combination, a brake pipe, means operative in response to a reduction in pressure of fluid in said brake pipe to supply fluid under pressure to effect an application of brakes, valve means responsive to pressure of fluid in a chamber to retard said supply of fluid under pressure and operative upon release of fluid under pressure from said chamber to provide for a faster rate of said supply, a second pipe, means operative by pressure of fluid in said brake pipe for venting said chamber, means operative upon an emergency reduction in pressure of fluid in said brake pipe to open said chamber to said second pipe, and selector means for either supplying fluid under pressure to said second pipe or for closing of such supply.

4. In a fluid pressure brake equipment, in combination, a brake pipe, normally vented application and application piston chambers, means responsive to pressure of fluid in said piston chamber to effect an application of brakes and responsive to release of fluid under pressure from said piston chamber to effect release of brakes, a normally charged pressure chamber, a passageway, brake control means operable upon a reduction in pressure of fluid in said brake pipe to open said pressure chamber to said passageway, valve means having one position for establishing a restricted communication between said passageway and said piston and application chambers and having a second position for establishing a communication of greater flow capacity than said restricted communication between said passageway and said piston chamber and for disconnecting said application chamber from said piston chamber, means operative by pressure of fluid in said brake pipe for positioning said valve means in its said second position, and means operative upon an emergency reduction in pressure in said brake pipe for effecting movement of said valve means to its said one position.

5. In a fluid pressure brake equipment, in combination, a brake pipe, normally vented application and application piston chambers, means responsive to pressure of fluid in said piston chamber to effect an application of brakes and responsive to release of fluid under pressure from said piston chamber to effect a release of brakes, a normally charged pressure chamber, a passageway, brake control means operable upon a reduction in pressure of fluid in said brake pipe to open said pressure chamber to said passageway, valve means having one position for establishing a restricted communication between said passageway and said piston and application chambers and having a second position for establishing a communication of greater flow capacity than said restricted communication between said passageway and said piston chamber and for disconnecting said application chamber from said piston chamber, operator's selector means having two control positions, and means cooperative with said selector means for effecting movement of said valve means to its said one position in one but not the other of said control positions, in response to an emergency reduction in pressure of fluid in said brake pipe.

6. In combination, a brake pipe, a normally charged pressure chamber, a normally vented application chamber, brake application means responsive to pressure of fluid in a control chamber to effect an application of brakes, brake control means operative in response to a service reduction in pressure of fluid in said brake pipe to open said pressure chamber to said application chamber and to a passageway and operative in response to an emergency reduction in pressure in said brake pipe to open said pressure chamber only to said passageway, controlled emergency means having one position for establishing a restricted communication between said passageway and said control and application chambers and another position for opening a communication of greater flow capacity between said passageway and said control chamber only, means operative by pressure of fluid in said brake pipe for effecting movement of said controlled emergency means to its other position, and means operative upon an emergency reduction in brake pipe pressure for effecting movement of said emergency control means to its one position.

7. In a locomotive fluid pressure brake equipment, in combination, a brake pipe, a distributing valve device comprising an application portion operable by fluid under pressure in a control chamber to effect an application of brakes, said distributing valve device further comprising a normally charged pressure chamber, a normally vented application chamber, a controlled emergency valve device and an equalizing portion operative in response to an emergency reduction in brake pipe pressure to open said pressure chamber to a passage, said controlled emergency valve device comprising means operative upon supply of fluid under pressure to another chamber to a position for establishing a restricted communication from said passage to said control and application chambers and operative upon venting of fluid under pressure from said other chamber to establish a communication of greater flow capacity between said passage and only said control chamber, a controlled emergency pipe, operator's selector means for selectively supplying fluid under pressure to or for venting said controlled emergency pipe, means operative by pressure of fluid in said brake pipe for venting said other chamber, and means operative upon an emergency reduction in brake pipe pressure for opening said other chamber to said controlled emergency pipe.

8. A locomotive fluid pressure brake equipment comprising in combination, a brake pipe, a distributing valve device comprising a pipe bracket, a reservoir portion carried by said bracket having a normally charged pressure chamber and a normally vented application chamber, an application valve device carried by said bracket operative in response to supply of fluid under pressure to an application passage in said bracket to effect an application of brakes, and a equalizing portion carried by said bracket operative upon a service reduction in pressure of fluid in said brake pipe to open said pressure chamber to said application chamber and to a second passage in said bracket and operative upon an emergency reduction in pressure of fluid in said brake pipe to open said pressure chamber to said second passage but not to said application chamber, controlled emergency valve means carried by said bracket having one position for establishing a restricted communication from said second passage to both said application passage and said application chamber and having a second position for establishing a communication of greater flow capacity from said second passage only to said application passage, means operative by pressure of fluid in said brake pipe for effecting movement of said controlled emergency means to its said second position, and means operative upon an emergency reduction in pressure of fluid in said brake pipe for effecting movement of said controlled emergency means to its said one position.

9. In a locomotive brake equipment, the combination with a brake pipe, of a distributing valve device comprising a pipe bracket, a reservoir mounted on said bracket having a normally charged pressure chamber and a normally vented application chamber, an application valve device responsive to supply of fluid under pressure to a first passage in said bracket to effect an application of brakes, an equalizing valve device operative upon a service reduction in pressure in said brake pipe to open said pressure chamber to a second passage in said bracket open to said application chamber and also to a third passage in said bracket and operative upon an emergency reduction in brake pipe pressure to open said pressure chamber to said third passage but not to said second passage, a controlled emergency valve device, a filler piece carried by said pipe bracket carrying said control emergency valve device and having passages opening said first and second passages in said bracket to said controlled emergency valve device, means connecting said third passage in said bracket to said controlled emergency valve device, said controlled emergency valve device including a piston subject to pressure of fluid in a control chamber, and means operative by said piston upon supply of fluid under pressure to said control chamber to establish a restricted communication from said third passage to said first and second passages and operative upon venting of said control chamber to open said first passage to said third passage but not to said second passage, a controlled emergency pipe, a selector valve device for either supplying fluid under pressure to or for venting said controlled emergency pipe, means operative by brake pipe pressure for venting said control chamber, and means operative upon an emergency reduction in brake pipe pressure for opening said control chamber to said controlled emergency pipe.

10. In a locomotive brake equipment, in combination, a brake pipe, a distributing valve device comprising an application portion operative in response to supply of fluid under pressure to a chamber to effect an application of brakes, an equalizing portion operative upon a reduction in pressure of fluid in said brake pipe to supply fluid under pressure to said chamber, a bracket carrying said application and equalizing portions, a controlled emergency valve device operative upon supply of fluid under pressure to a chamber for restricting flow of fluid under pressure from said equalizing portion to the chamber of said application portion and upon venting of such chamber to provide for a more rapid rate of such flow, a first filler piece carrying said controlled emergency valve device, a second filler piece carried by said bracket carrying said first filler piece, said second filler piece comprising a selector valve for selectively supplying fluid under pressure to or venting fluid under pressure from a passage, and means controlled by brake pipe pressure for venting said chamber in said controlled emergency valve device except upon an emergency reduction in brake pipe pressure and for then connecting said passage to the last named chamber.

IRWIN M. EISENBERG.

References Cited in the file of this patent
UNITED STATES PATENTS

| Number | Name | Date |
|---|---|---|
| 2,058,016 | Hewitt | Oct. 20, 1936 |
| 2,130,620 | Hewitt | Sept. 20, 1938 |
| 2,106,479 | Fitch | Jan. 25, 1938 |
| 2,276,812 | Webb et al. | Mar. 17, 1942 |
| 2,445,680 | Linhart | July 20, 1948 |